(12) United States Patent
Vigroux et al.

(10) Patent No.: US 7,869,481 B2
(45) Date of Patent: Jan. 11, 2011

(54) HIGH POWER SOLID-STATE OPTICAL AMPLIFICATION PROCESS AND SYSTEM

(75) Inventors: Luc Vigroux, Montlhery (FR); Pierre-Mary Paul, Draveil (FR); Fabien Ple, Paris (FR)

(73) Assignee: Amplitude Technologies, Lisses (FR)

( * ) Notice: Subject to any disclaimer, the term of this patent is extended or adjusted under 35 U.S.C. 154(b) by 28 days.

(21) Appl. No.: 12/483,597

(22) Filed: Jun. 12, 2009

(65) Prior Publication Data

US 2010/0316085 A1    Dec. 16, 2010

(51) Int. Cl.
*H01S 5/00* (2006.01)
(52) U.S. Cl. .................. 372/50.22; 372/66; 372/69; 372/99
(58) Field of Classification Search ............. 372/50.22, 372/66, 69
See application file for complete search history.

(56) References Cited

U.S. PATENT DOCUMENTS

| | | | |
|---|---|---|---|
| 7,248,609 B2 * | 7/2007 | Johnstone et al. | 372/25 |
| 7,515,625 B2 * | 4/2009 | Ishizu | 372/66 |
| 2010/0086001 A1 * | 4/2010 | Manni | 372/66 |

* cited by examiner

*Primary Examiner*—Dung T Nguyen
(74) *Attorney, Agent, or Firm*—Young & Thompson

(57) ABSTRACT

A high power solid-state non-regenerative optical amplification system (100) for amplifying a pulsed optical beam, includes a first optical amplification crystal ($C_1$) and a second optical amplification crystal ($C_2$) for amplifying the optical beam; optical pumping elements for longitudinal pumping amplification crystals ($C_1$, $C_2$); reflective optical elements ($M'_1, M'_2, \ldots, M'_{17}$) suitable for reflecting the optical beam so that the optical beam makes a total number of N sequential passes through the amplification crystals ($C_1$, $C_2$), wherein N is an integer and N>4. The reflective optical elements ($M'_1, M'_2, \ldots, M'_{17}$) are placed in a configuration suitable for alternatively interleaving the sequential optical beam passes through the $1^{st}$ crystal ($C_1$) and through the $2^{nd}$ crystal ($C_2$). A solid-state laser including the amplification system, and a method for amplifying a pulsed optical beam in a two-crystal multi-pass non-regenerative amplification system are also disclosed.

13 Claims, 3 Drawing Sheets

HIGH POWER SOLID-STATE OPTICAL AMPLIFICATION PROCESS AND SYSTEM

FIELD OF THE INVENTION

The present invention concerns a high power optical amplification system and method. More particularly, the invention concerns an optical amplifier based on solid-state gain medium, such as doped glasses or crystals and a method for increasing output energy without transverse lasing.

RELATED ART

There are mainly two types of solid-state amplification systems for high energy, ultra short pulses: regenerative amplifiers and multipass amplifiers. A regenerative amplifier comprises an optical system forming a resonant cavity that includes the gain medium. In a regenerative amplifier, the number N of passes of the optical beam through the gain medium is very important (N>10). In contrast, a multipass amplifier generally comprises a thin, high gain medium and an optical system that allows only a limited number of passes (N=2–8) of the optical beam to be amplified through the gain medium. The present invention concerns a multipass non-regenerative amplification system and method.

Multipass amplifiers are the core of solid-state laser systems. Such lasers are required with increasing energy, power and shorter pulse duration. In particular, there is a need for high power lasers, in the Petawatt range. There is also a need for ultrashort pulse lasers, with high repetition rate and energy level around few tens of Joules per pulse.

The scaling of high energy laser for the production of very high intensity pulses requires large aperture solid-state gain medium. For example, a Ti-Sapphire laser uses one or several Titanium doped sapphire crystals. The largest Ti:sapphire crystals available are cylinders or disks of 10 cm diameter and a few centimeters length (1-5 cm).

Briefly, the optical amplification process is based on spontaneous emission of a gain medium when the amplifying medium is pumped optically. An optical amplifier generally comprises a non linear crystal that is pumped at a pump wavelength $\lambda_P$ different from the emission wavelength $\lambda_e$. The optical pumping is generally longitudinal, along the crystal cylinder axis and in the same direction as the amplified beam propagation (propagative pumping) and/or in the opposite direction (contra-propagative pumping).

There are several solutions for increasing the output beam energy: increasing the pump power, increasing the gain-medium surface exposed to the pump beam, and/or the gain-medium size.

Larger Ti:Sa crystals are used for increasing the pump absorption and the overall gain of the amplifier.

Bonlie et al. (Production of >$10^{21}$ W/cm$^2$ from a large aperture Ti:sapphire laser system, Appl. Phys. B 70, 2000, S155-S160) describe a laser system using two Ti: sapphire amplifiers in "V" configurations, wherein the pulsed beam double-passes the first Ti:sapphire amplifier, and then double-passes the $2^{nd}$ Ti:sapphire amplifier. The two amplifiers thus amplify the pulse sequentially, the pulse amplified by the first amplifier being injected into the second amplifier.

However, Bonlie et al. disclose also that adverse effects of transverse lasing occur as crystal diameter and pump power increase. Transverse lasing is due to the formation of "laser cavities" inside the crystal and induced by the pumping beam (3, 4), as represented schematically FIG. 1. Total internal reflections (R=1) of the pumping beam on the crystal edges can create parasitic transverse lasing (5), that decrease the output beam energy.

For a cylindrical crystal 1, cavities are created in a plane transverse to the optical axis (2). In order to avoid multiple internal reflections, the input and output plane faces of crystal (1) are coated with an anti-reflection coating. However, pumping beams with an angle of incidence above 36 degrees on the anti-reflection coated faces are totally reflected. The optical losses (diffusion and absorption) depend on the index of reflection of the crystal and of the outside medium. Transverse lasing occurs depending on the product of the optical losses by the volume gain.

Transverse gain, $G^t(0)$, at the crystal surface for a cavity as represented in FIG. 1 is given by the following formula:

$$G_0^t(0) = \exp\left(\frac{-\sigma_e J_0 \mu_c \Phi \lambda_p \ln(1 - A^{\lambda_p})}{hcl}[2 - A^{\lambda_p}]\right) \quad (1)$$

Where $\lambda_p$ is the pump wavelength, $A^{\lambda_p}$ is the crystal absorption at pump wavelength, $\sigma_e$ is the amplification cross section at emission wavelength $\lambda_e$, $J_0$ pump fluence on a crystal face, $\phi$ the pump beam diameter and $\mu_c$ the coupling efficiency, that defines non radiative losses (depending on the crystal temperature). h is the planck constant (6.6 $10^{-34}$ J·s), c is the speed of light in vacuum (3 $10^8$ m/s), and/the crystal length.

We derive from equation (1) that, for a constant pump fluence, transverse gain $G^t$ increases exponentially with the pump beam diameter $\phi$, whereas the extracted energy only increases quadratically.

The problem of transverse lasing thus becomes a major concern as higher energy output beams are required.

Bonlie et al. disclose the use of an edge cladding around the Ti:sapphire crystal, said cladding comprising a doped polymer with an absorber for reducing transverse lasing. However, the aging of polymers and absorbing materials when exposed to high repetition laser pulses is unknown.

Besides, the use of increasingly larger Ti:sapphire single crystal (above 10 cm diameter) generates several issues. The quality requirements, availability and cost of such large size single crystal turn into reliability issues for the high energy laser chain.

BRIEF SUMMARY OF THE INVENTION

The object of the invention is to provide high power amplification system and method with limited transverse lasing. Another goal of the invention is to provide a stable, reliable and cost-effective amplification system and method.

More precisely, the invention concerns a high power solid-state non-regenerative optical amplification system for amplifying a pulsed optical beam, said amplification system comprising:

a first optical amplification crystal ($C_1$) and a second optical amplification crystal ($C_2$) for amplifying said optical beam;

optical pumping means for longitudinal pumping amplification crystals ($C_1$, $C_2$);

reflective optical means suitable for reflecting the optical beam so that the optical beam makes a total number of N sequential passes through said amplification crystals ($C_1$, $C_2$), wherein N is an integer and N≧3.

According to the invention, the reflective optical means are placed in a configuration suitable for alternatively interleaving the sequential optical beam passes through the 1st crystal ($C_1$) and through the 2nd crystal ($C_2$).

According to an embodiment of the invention, the reflective optical means are arranged so that the optical beam makes multiple passes through the two crystals ($C_1$, $C_2$) including sequentially:

at least a first pass through 1st amplification crystal ($C_1$),
at least a first pass through 2nd amplification crystal ($C_2$),
at least another pass through 1st amplification crystal ($C_1$), and
at least another pass through 2nd amplification crystal ($C_2$).

According to a preferred embodiment of the invention, the reflective optical means are placed in "V" configuration so that the optical beam makes sequentially:

a first pass through 1st amplification crystal ($C_1$),
a double pass through 2nd amplification crystal ($C_2$),
a double pass through 1st amplification crystal ($C_1$), and
a double pass through 2nd amplification crystal ($C_2$).

Various embodiments the invention also concern the following features, that can be considered alone or according to all possible technical combinations and each bring specific advantages:

the total number N of passes through said amplification crystals ($C_1$, $C_2$) is lower than 10;
said amplification crystals ($C_1$, $C_2$) are Titanium doped sapphire crystals or Nd:glass;
said amplification crystals ($C_1$, $C_2$) have the same diameter $\Phi$ and the to same thickness L;
said amplification crystals ($C_1$, $C_2$) have different sizes;
the maximum transverse gain $G_t$ in the amplification crystals ($C_1$, $C_2$) is lower than 50.

The invention also concerns a solid-state laser comprising an amplification system according to the invention.

In particular, the invention concerns a Petawatt laser comprising an amplification system according to the invention.

The invention also concerns a method for amplifying a pulsed optical beam in a two-crystals non-regenerative amplification system according to the invention and comprising the following steps:

longitudinally pumping two optical amplification crystals ($C_1$, $C_2$);
injecting said optical beam said 1st amplification crystal ($C_1$);
reflecting said optical beam for multiple sequential passes through the two optical amplification crystals ($C_1$, $C_2$), wherein the multiple pass step includes alternatively interleaving the optical beam passes through the 1st crystal ($C_1$) and through the 2nd crystal ($C_2$) by means of the optical reflective system.

According to a preferred embodiment of the method of the invention, the multiple pass step comprises the following steps:

at least a first pass through 1st amplification crystal ($C_1$),
at least a first pass through 2nd amplification crystal ($C_2$),
at least another pass through 1st amplification crystal ($C_1$), and
at least another pass through 2nd amplification crystal ($C_2$).

According to a preferred method, the amplification process comprises the following steps:

a first pass through 1st amplification crystal ($C_1$),
a double pass through 2nd amplification crystal ($C_2$),
a double pass through 1st amplification crystal ($C_1$), and
a double pass through 2nd amplification crystal ($C_2$).

BRIEF DESCRIPTION OF SEVERAL VIEWS OF THE DRAWINGS

The following description is given as an example of the invention but can have various embodiments that will be better understood when referring to the following figures.

DETAILED DESCRIPTION OF THE INVENTION

Figure 1:
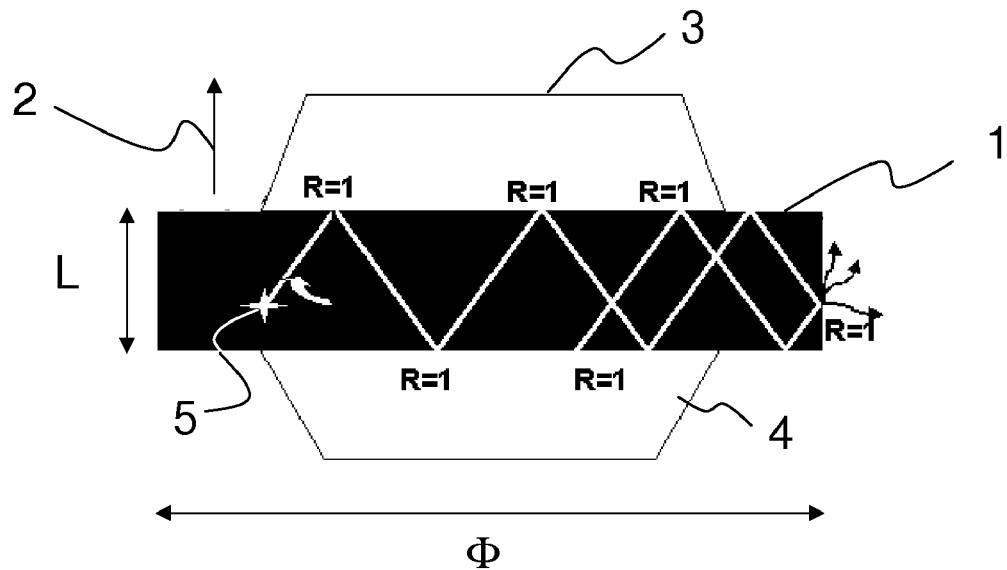
FIG. 1 represents schematically a cross-section view of a Ti:sapphire crystal and of transverse lasing induced by pump beams in the crystal.

FIG. 1 is a cross-section view of a large aperture amplification crystal (1) with longitudinal propagative and contra-propagative pump beams (3, 4). The crystal (1) is generally a straight cylinder with disk shaped faces of diameter $\Phi$ and length L and with an optical axis (2). The amplification crystal (1) is pumped longitudinally by one or two longitudinal pump beams (3, 4) for pumping the crystal through the two flat faces. Fluorescence beam can propagate inside the crystal and be reflected on the flat faces and/or the outer surface. Losses can occur at the interfaces due to diffusion for example. However, for Ti:Sa crystal (refractive index n=1.76), if the angle of incidence of the beam is above 36 degrees, the beam is totally reflected (reflection coefficient R=1) and transverse lasing (5) can occur inside crystal (1).

For reference and future comparison with a double crystal multipass system, and with an embodiment of the invention, a prior art single crystal amplification system has the following operating parameters. The maximum energy pump is set at 160 J and the maximum operating fluences at 1 J·cm$^{-2}$ for a crystal having a diameter $\Phi$ of 15 cm, a length L of 3 cm and 90% absorption at $\lambda_p$=532 nm. It is necessary to makes N=6 passes through this single crystal for reaching saturation and amplification of the infrared (800 nm) pulse. In such conditions, the amplifier parameters are as follows:

Fluence at $\lambda_p$=532 nm:0.95 J·cm$^{-2}$
Fluence at 800 nm:0.7 J·cm$^{-2}$
Output energy after 6 passes:67 J
Pump beam diameter at $\lambda_p$ (532 nm):12 cm
Optical beam diameter at 800 nm:11.5 cm
Maximum transverse gain $G^t$:400

The transverse gain for a single crystal amplifier is extremely large. The above example confirms that transverse lasing becomes a major issue with crystal dimensions ($\Phi$ and L) and with the beam fluence.

Figure 2:
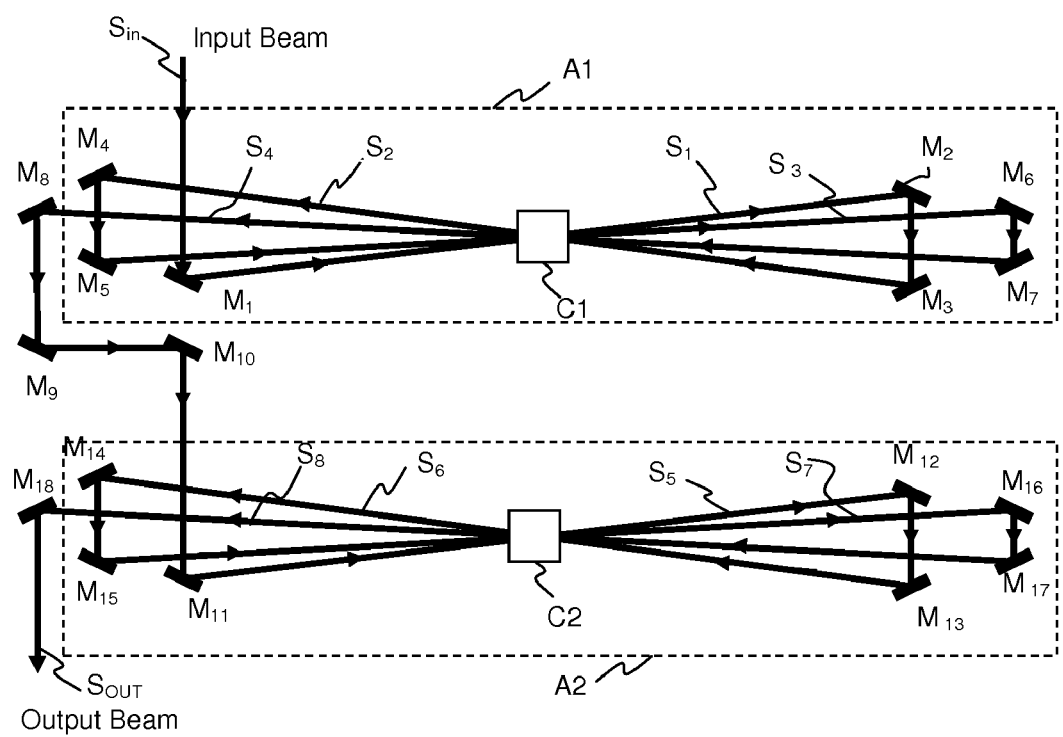
FIG. 2 represents schematically a prior art multipass amplification system comprising two amplification crystals, each in a bow-tie configuration.

FIG. 2 represents a prior art amplification system comprising two amplifiers ($A_1$, $A_2$) each schematically surrounded by a dashed line. Optical pumping means are not represented on FIG. 2. Pumping beams are assumed to be conventional longitudinal propagative and contra-propagative beams. Each amplifier ($A_1$, $A_2$) comprises an amplification crystal ($C_1$, $C_2$) and an optical system for multipass amplification through each crystal.

Considering the $1^{st}$ amplifier $A_1$, the optical system is a reflective optical system comprising mirrors $M_1$-$M_7$. The mirrors are arranged in a well-known bow-tie configuration, for enabling the optical beam to pass $N_i$ times through amplification crystal 1. The input beam $S_{in}$ is directed by mirror $M_1$ through the first crystal ($C_1$). $S_1$ represents the optical beam $S_{in}$ amplified after the first pass through first crystal ($C_1$). $S_1$ propagates and is reflected successively by mirrors $M_2$ and $M_3$ towards the first crystal ($C_1$) for a second pass. After passing through ($C_1$), the beam $S_1$ is amplified into $S_2$. $S_2$ is reflected by mirrors $M_4$ and $M_5$ and directed for a third pass through first crystal ($C_1$). After the third pass, amplified beam $S_3$ is reflected by mirrors $M_6$ and $M_7$ and directed for a fourth pass through first crystal ($C_1$) and amplified into $S_4$ beam. In the example of FIG. 2, the optical beam is amplified successively by $N_1$=4 passes through crystal ($C_1$). Multiple passes enable to reach saturation inside crystal ($C_1$) and thus maximum amplification.

An intermediate reflective optical system (mirrors $M_8$-$M_{10}$) transfers the optical beam amplified by the $1^{st}$ amplifier $A_1$ and injects it into the $2^{nd}$ amplifier ($A_2$). $S_4$ beam exits out of Amplifier 1 and is directed by the mirrors $M_8$, $M_9$ and $M_{10}$ towards a second amplification stage.

Similarly to the first amplifier $A_1$, the second amplifier $A_2$ comprises a second amplification crystal ($C_2$) and a reflective optical system (mirrors $M_{11}$-$M_{17}$), for passing the optical beam $N_2$ times through crystal ($C_2$). $S_4$ beam is reflected by mirror $M_{11}$ and directed for a first pass through second crystal $C_2$. After passing through ($C_2$), the beam $S_4$ is amplified into $S_5$. Amplified beam $S_5$ is reflected by mirrors $M_{12}$ and $M_{13}$ and directed for a second pass through crystal ($C_2$). After the second pass through $C_2$, amplified beam $S_6$ is reflected by mirrors $M_{14}$ and $M_{15}$ and directed for a third pass through second crystal ($C_2$) and amplified into $S_7$ beam. Beam $S_7$ is reflected by mirrors $M_{16}$ and $M_{17}$ and directed for a fourth pass through second crystal ($C_2$) and amplified into $S_8$ beam. Beam $S_8$ is thus amplified successively four times through first crystal $C_1$ and then four times through second crystal $C_2$.

As a reference for future comparison with an embodiment of the invention, a prior art system as represented on FIG. 2 comprises two Titanium:sapphire crystals of same length (3 cm) and absorption 90% at 532 nm.

The $1^{st}$ amplifier (A1) parameters are as follows:
Crystal Diameter $\Phi_1$:7.5 cm
Pump beam diameter at $\lambda_p$ (532 nm):6 cm
Optical beam diameter at 800 nm:5.5 cm
Pump energy:40 J/Fluence at $\lambda_p$ (532 nm):0.94 J·cm$^{-2}$
Input energy at 800 nm:5 J/Maximum fluence:0.9 J·cm$^{-2}$
Output energy after 4 passes:20 J
Maximum transverse gain $G^t$:100
The $2^{nd}$ amplifier ($A_2$) parameters are as follows:
Crystal Diameter $\Phi_2$:12.5 cm
Pump beam diameter at $\lambda_p$ (532 nm):10 cm
Optical beam diameter at 800 nm:9.5 cm
Pump energy (532 nm):120 J/Fluence at $\lambda_p$:1 J·cm$^{-2}$
Input energy at 800 nm:20 J/Maximum fluence:1 J·cm$^{-2}$
Output energy after 4 passes:67.5 J
Maximum transverse gain $G^t$:200

Figure 3:
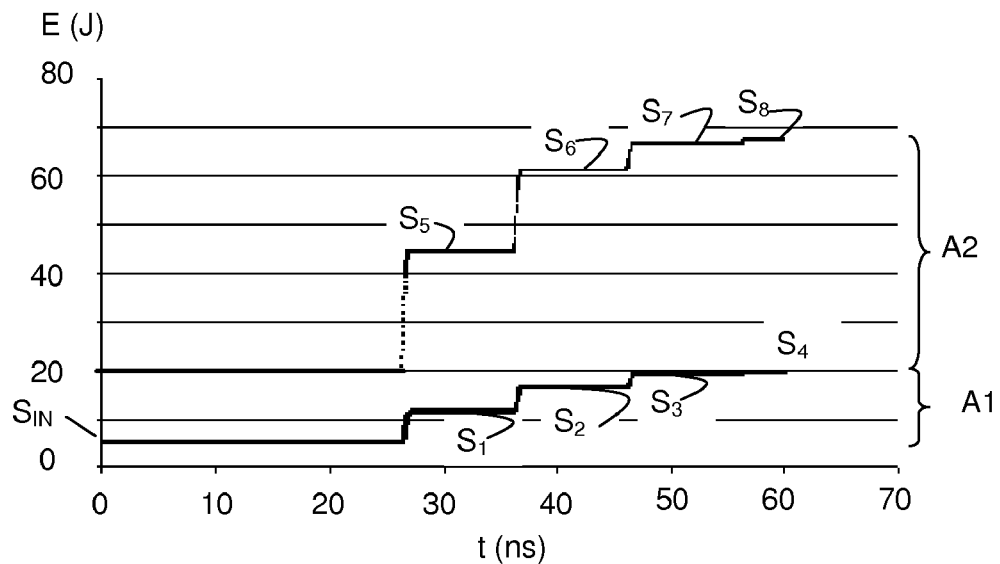
FIG. 3 represents an example of energy amplified in a multipass system as represented in FIG. 2 as a function of time, and for the successive passes though the 1st and 2nd crystal.

FIG. 3 represents the progressive amplification of the optical beam in a prior art two crystals amplification system, with above parameters, wherein the optical beam makes 4 passes inside each amplification crystal (total N=8). The lower curve corresponds to $A_1$ amplification, and the upper curve to $A_2$ amplification. The input energy in $A_1$ is 5 J at 800 nm. The output energy of $A_1$ is 20 J after 4 passes. The optical beam amplified by $A_1$ is the injected into A2 and amplified again. The output energy after 4 passes through $A_2$ is 67.5 J. In the example represented FIG. 3, we observe a progressive saturation of the energy for each crystal, and the $4^{th}$ path in each crystal appears unnecessary.

In summary, prior art multipass amplification system, as illustrated in FIGS. 2-3 comprise two crystals for serial amplification of the optical beam, up to the maximum gain corresponding to the sum of the gains of the two crystals ($C_1$, $C_2$).

Figure 4:
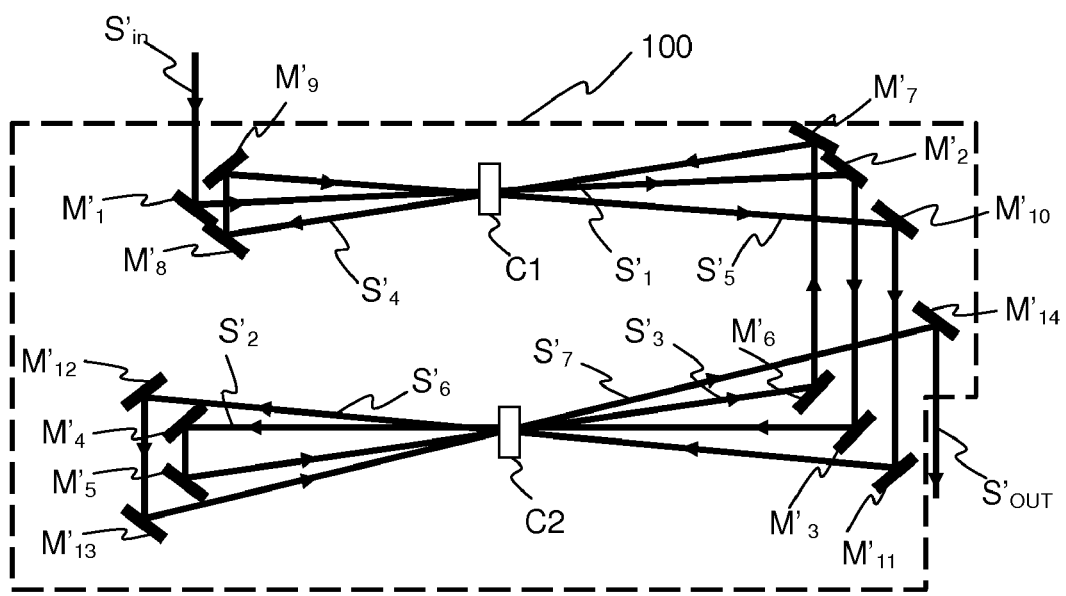
FIG. 4 represents schematically a first embodiment of a multipass amplifier according to the invention.

FIG. 4 represents schematically a first embodiment of a multipass amplifier according to the invention. The amplification system (100) comprises two amplification crystals ($C_1$, $C_2$). Optical pumping means are not represented on FIG. 4. Pumping beams are assumed to be conventional longitudinal propagative and contra-propagative beams. The amplification system also comprises an optical system ($M'_1$-$M'_{13}$) for multipass amplification through the two crystals ($C_1$, $C_2$). However, in contrast with prior art multiple crystals amplification system, the optical beam does not follow a serial amplification through the different crystals, with a first amplification in a first crystal and then sequentially a second amplification in the $2^{nd}$ crystal.

As evidenced on FIG. 4, the input optical beam $S'_i$ makes a first pass through the $1^{st}$ amplification crystal ($C_1$), and forms an amplified beam $S'_1$. Mirrors $M'_2$-$M'_3$ inject the $S'_1$ beam into the second amplification crystal ($C_2$). After a first pass through $2^{nd}$ amplification crystal ($C_2$) the amplified beam is labelled $S'_2$. In the embodiment of FIG. 4, the amplified beam $S'_2$ is reflected by mirrors $M'_4$-$M'_5$ for passing again through the $2^{nd}$ crystal ($C_2$) and forms amplified beam $S'_3$. Then, the amplified beam $S'_3$ is injected using mirrors $M'_6$-$M'_7$ into the first crystal ($C_1$) for another pass through the $1^{st}$ crystal ($C_1$). Mirrors $M'_8$-$M'_9$ inject amplified beam $S'_4$ into the $1^{st}$ crystal for a $3^{rd}$ pass through this $1^{st}$ crystal ($C_1$). Mirrors $M'_{10}$-$M'_{11}$ inject amplified beam $S'_5$ into the $2^{nd}$ crystal ($C_2$) for a $3^{rd}$ pass, thus forming amplified beam $S'_6$. Mirrors $M'_{12}$-$M'_{13}$ fold amplified beam $S'_6$ and inject it for a fourth pass through crystal ($C_2$). Mirror $M'_{14}$ extracts the amplified $S'_7$ beam out of amplification system (100).

In summary, the optical beam makes a total of N=7 passes through the amplification crystals, including three passes through crystal ($C_1$) and four passes through crystal ($C_2$). In contrast to prior art multi-crystal amplification systems, the passes through the different crystals ($C_1$, $C_2$) are interleaved. More precisely, the sequential passes through the first crystal $C_1$ and through the second crystal $C_2$ are alternatively interleaved. In the above example, after the $1^{st}$ pass through the $1^{st}$ crystal ($C_1$), following passes are double-passes alternatively though the $2^{nd}$ and $1^{st}$ crystal.

Alternatively, the $1^{st}$ pass in $C_1$ can be a double pass.

In an example, the length of each crystal ($C_1$, $C_2$) is 3 cm and their diameter 12.5 cm. The pump beam wavelength is 532 nm. The crystal absorption at 532 nm is 90%. The pump beam diameter is 10 cm, and the diameter of the optical beam (to be amplified) is 9.5 cm. The overall pump energy is 80 J for each crystal, and the pump fluence at 532 nm is 0.7 J·cm$^{-2}$. The input optical beam energy is 5 J at 800 nm, and the maximum fluence is 0.92 J·cm$^{-2}$. The output energy after 8 passes is 68.3 J. The maximum transverse gain is $G^t$=40 in each crystal ($C_1$, $C_2$).

Crystal Diameter $\Phi_1$=$\Phi_2$:12.5 cm
Pump beam diameter at $\lambda_p$ (532 nm):10 cm
Optical beam diameter at 800 nm:9.5 cm
Pump energy (532 nm):80 J/Fluence at $\lambda_p$:0.7 J·cm$^{-2}$
Input energy at 800 nm:5 J/Maximum fluence:0.92 J·cm$^{-2}$ Output energy after 8 passes (total):68.3 J Maximum transverse gain $G^t$:40

Figure 5:
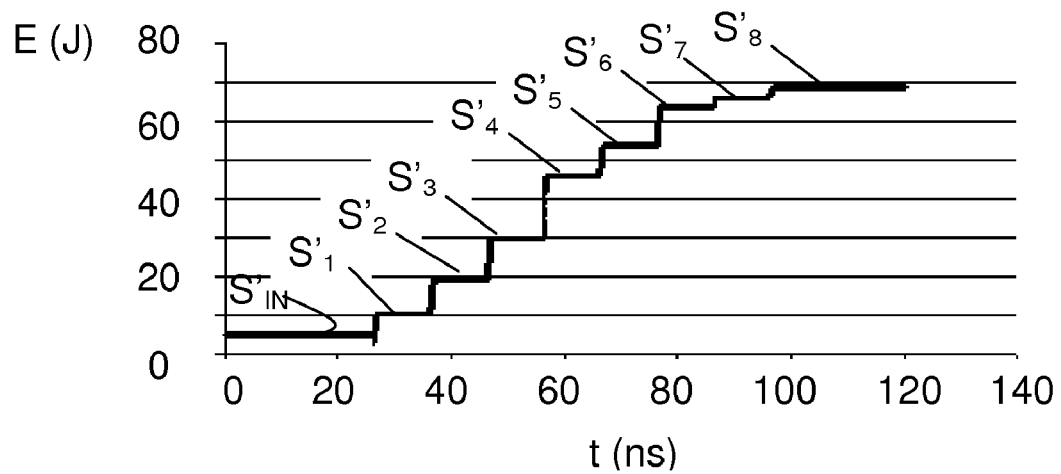
FIG. 5 represents a simulation of energy build-up as a function of time and as a function of interleaved passes through the 1st and 2nd crystals.

FIG. 5 represents the progressive amplification of the optical beam in an example corresponding to the configuration of FIG. 4 using the above operating parameters.

We observe a regular amplification, almost linear by steps, during the interleaved passes through the $1^{st}$ and $2^{nd}$ amplification crystals $C_1$ and $C_2$.

The energy at the output of the amplification system represented in FIG. 5 is 68.7 J for 5 J input energy, which corresponds approximately to the same energy levels as observed for the system presented in FIGS. 2-3. The overall gain of the prior art system and of the embodiment of the invention are thus similar.

However, as compared to prior art system, the transverse gain inside both amplification crystals of the preferred embodiment of the invention is much lower: $G^t$=40 instead of 200.

In addition, the pump density is also lower on both crystals (0.7 J·cm$^{-2}$, instead of 1 J·cm$^{-2}$), resulting in a higher transverse lasing threshold, better extraction, and in an improved crystal protection against damage.

Figure 6:
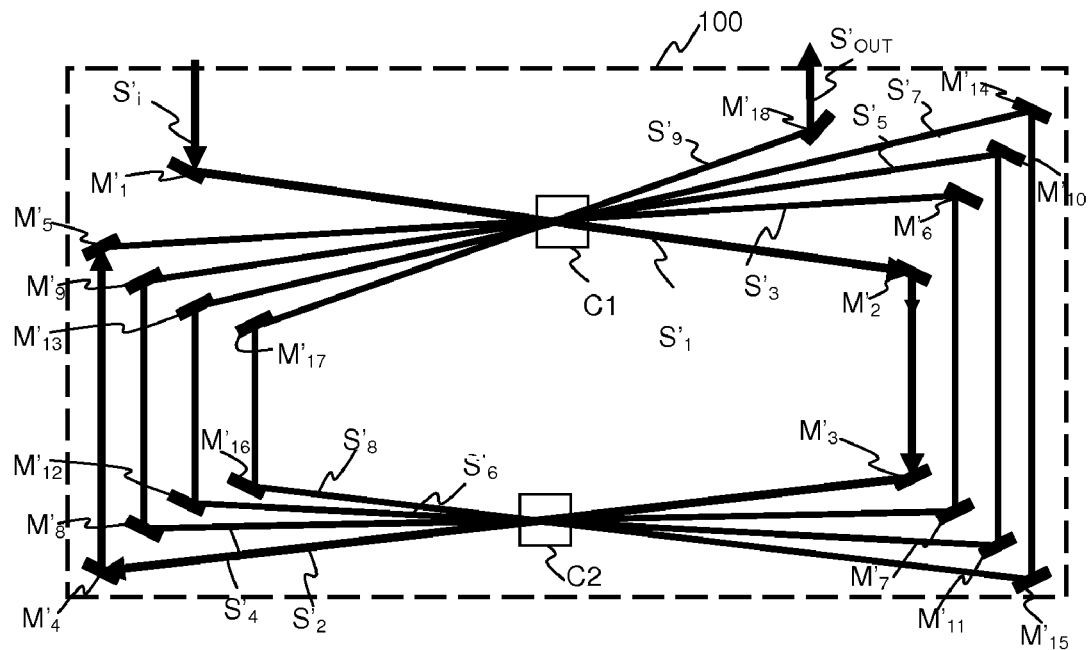
FIG. 6 represents schematically another embodiment of the multipass amplifier according to the invention.

FIG. 6 represents schematically another embodiment of the invention. In the embodiment of FIG. 6, the beam makes single passes alternatively through the first crystal (C1) and through the second crystal (C2).

As evidenced on FIG. 6, the input optical beam $S'_i$ is reflected by mirror $M'_1$, makes a first pass through the $1^{st}$ amplification crystal ($C_1$), and forms an amplified beam $S'_1$. Mirrors $M'_2$-$M'_3$ inject the $S'_1$ beam into the second amplification crystal ($C_2$). After a first pass through $2^{nd}$ amplification crystal ($C_2$) the amplified beam is labelled $S'_2$. In the embodiment of FIG. 6, the amplified beam $S'_2$ is reflected by mirrors $M'_4$-$M'_5$ for passing again through the $1^{st}$ crystal ($C_1$) and forms amplified beam $S'_3$. Then, the amplified beam $S'_3$ is injected using mirrors $M'_6$-$M'_7$ into the second crystal ($C_2$) for another pass through the $2^{nd}$ crystal ($C_2$). Mirrors $M'_8$-$M'_9$ inject amplified beam $S'_4$ into the $1^{st}$ crystal for a $3^{rd}$ pass through this $1^{st}$ crystal ($C_1$). Mirrors $M'_{10}$-$M'_{11}$ inject amplified beam $S'_5$ into the $2^{nd}$ crystal ($C_2$) for a $3^{rd}$ pass, thus forming amplified beam $S'_6$. Mirrors $M'_{12}$-$M'_{13}$ inject amplified beam $S'_6$ into the $1^{st}$ crystal for a $4^{th}$ pass through this $1^{st}$ crystal ($C_1$). Mirrors $M'_{14}$-$M'_{15}$ inject amplified beam $S'_7$ into the $2^{nd}$ crystal ($C_2$) for a $4^{th}$ pass, thus forming amplified beam $S'_8$. Mirrors $M'_{16}$-$M'_{17}$ inject amplified beam $S'_8$ into the $1^{st}$ crystal for a $5^{th}$ pass through first crystal ($C_1$), thus forming amplified beam $S'_9$. Mirror $M'_{18}$ extracts the amplified $S'_9$ beam out of amplification system (100).

In summary, in the embodiment of FIG. 6, the optical beam makes a total of N=9 interleaved passes through the amplification crystals, including five passes through crystal ($C_1$) and four passes through crystal ($C_2$).

In contrast to prior art multi-crystal amplification systems, the passes through the different crystals ($C_1$, $C_2$) are interleaved. More precisely, the sequential passes are alternatively interleaved through the different crystals.

In the embodiment of FIG. 4, after the $1^{st}$ pass through the $1^{st}$ crystal ($C_1$), following passes are double-passes alternatively though the $2^{nd}$ and $1^{st}$ crystal. Double passes through a crystal are performed in opposite directions along the crystal optical axis.

In the embodiment of FIG. 6, after the $1^{st}$ pass through the $1^{st}$ crystal ($C_1$), following passes are single passes alternatively though the $2^{nd}$ and $1^{st}$ crystal. The beam passes through a crystal are all in the same direction.

According to various embodiments of the invention, each amplification crystal ($C_1$, $C_2$, . . . , $C_M$) can be temperature controlled. For example, the temperature of each crystal $(C_i)_{i=1...M}$ can be controlled independently in order to control the gain of each amplification medium.

Different crystals ($C_1$, $C_2$, . . . , $C_M$) having different doping levels can also be used in order to control the gain of each amplification medium.

Another advantage of the system and method of the invention is that the use of multiple (minimum two) amplification crystals provides smoothing of to crystal defects.

The invention provides an improved system stability (large number of pump beams). The alternatively interleaved pass configuration allows to balance saturation among the two (or more) crystals. In the prior art serial configuration, most of the amplification process occurs during the first two passes through each crystal. In contrast, the interleaved pass configuration of the invention produces a significant amplification at each pass. In prior art multi-crystal configuration, the second crystal is exposed to very high infrared fluence, that can be destructive. The interleaved configuration is less stringent relatively to pumping and guarantees a higher long terme stability (laser pump drift is less critical).

The multipass amplification method according to the invention interleaves amplification between different amplification crystals. This method enables progressive saturation of the different amplification medium. The balanced saturation among the two amplification crystals provides long term stability of the system.

The system and method of the invention apply to a high power solid-state laser, and in particular to a Petawatt laser system.

In a preferred embodiment, the amplification system of the invention comprises two amplification crystals.

However, the amplification system can be scaled for higher amplification gain, using more than two amplification crystals, without increasing the amplification crystal size. The pump fluence remains also limited on all amplification crystals.

The invention applies to high power laser, and in particular lasers having either low repetition rate and high energy, or high repetition rate and low energy.

The invention claimed is:

1. High power solid-state non-regenerative optical amplification system (100) for amplifying a pulsed optical beam, the amplification system comprising:

a first optical amplification crystal ($C_1$) and a second optical amplification crystal ($C_2$) for amplifying said optical beam;

optical pumping means for longitudinal pumping amplification crystals ($C_1$, $C_2$);

reflective optical means ($M'_1$, $M'_2$, . . . , $M'_{17}$) suitable for reflecting the optical beam so that the optical beam makes a total number of N sequential passes through said amplification crystals ($C_1$, $C_2$), wherein N is an integer and N≧3;

characterized in that:

the reflective optical means ($M'_1$, $M'_2$, . . . , $M'_{17}$) are placed in a configuration suitable for alternatively interleaving the sequential optical beam passes through the $1^{st}$ crystal ($C_1$) and through the $2^{nd}$ crystal ($C_2$).

2. High power amplification system according to claim 1 wherein the reflective optical means ($M'_1$, $M'_2$, . . . , $M'_{17}$) are arranged so that the optical beam makes multiple passes through the two crystals ($C_1$, $C_2$) including sequentially:

at least a first pass through $1^{st}$ amplification crystal ($C_1$), at least a first pass through $2^{nd}$ amplification crystal ($C_2$), at least another pass through 1$^{st}$ amplification crystal ($C_1$), and at least another pass through 2$^{nd}$ amplification crystal ($C_2$).

3. High power amplification system according to claim 2 characterized in that the reflective optical means (M'$_1$, M'$_2$, ..., M'$_{17}$) are placed in "V" configuration so that the optical beam makes sequentially:

a first pass through 1$^{st}$ amplification crystal ($C_1$),
a double pass through 2$^{nd}$ amplification crystal ($C_2$),
a double pass through 1$^{st}$ amplification crystal ($C_1$), and
a double pass through 2$^{nd}$ amplification crystal ($C_2$).

4. High power amplification system according to claim 1 characterized in that the total number N of passes through said amplification crystals ($C_1$, $C_2$) is lower than 10.

5. High power amplification system according to claim 1 characterized in that said amplification crystals ($C_1$, $C_2$) are chosen among Titanium doped sapphire crystals and Nd:Glass.

6. High power amplification system according to claim 1 characterized in that said amplification crystals ($C_1$, $C_2$) have the same diameter $\Phi$ and the same thickness L.

7. High power amplification system according to claim 1 characterized in that said amplification crystals ($C_1$, $C_2$) have different sizes.

8. High power amplification system according to claim 1 wherein the maximum transverse gain $G_t$ in the amplification crystals ($C_1$, $C_2$) is lower than 50.

9. Solid-state laser comprising an amplification system according to claim 1.

10. Petawatt laser comprising an amplification system according to claim 1.

11. Method for amplifying a pulsed optical beam in a two-crystals non-regenerative amplification system according to claim 1 comprising the steps of:

longitudinally pumping two optical amplification crystals ($C_1$, $C_2$);
injecting said optical beam into said 1$^{st}$ amplification crystal ($C_1$);
reflecting said optical beam for multiple sequential passes through the two optical amplification crystals ($C_1$, $C_2$)
wherein the multiple pass step includes alternatively interleaving the optical beam passes through the 1$^{st}$ crystal ($C_1$) and through the 2$^{nd}$ crystal ($C_2$) by means of the optical reflective system (M'$_1$, M'$_2$, ..., M'$_{17}$).

12. Method for amplifying a pulsed optical beam according to claim 11 wherein the optical beam is reflected so that it makes:

at least a first pass through 1$^{st}$ amplification crystal ($C_1$),
at least a first pass through 2$^{nd}$ amplification crystal ($C_2$),
at least another pass through 1$^{st}$ amplification crystal ($C_1$), and
at least another pass through 2$^{nd}$ amplification crystal ($C_2$).

13. Method according to claim 12 wherein the amplification process comprises the following steps:

a first pass through 1$^{st}$ amplification crystal ($C_1$),
a double pass through 2$^{nd}$ amplification crystal ($C_2$),
a double pass through 1$^{st}$ amplification crystal ($C_1$), and
a double pass through 2$^{nd}$ amplification crystal ($C_2$).

* * * * *